(12) United States Patent
Gretz

(10) Patent No.: US 6,310,290 B1
(45) Date of Patent: Oct. 30, 2001

(54) CABLE CONNECTOR

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 09/833,153

(22) Filed: Apr. 12, 2001

(51) Int. Cl.$^7$ ...................................... H02G 3/18
(52) U.S. Cl. ............... 174/65 R; 174/64; 174/135; 248/56; 439/583
(58) Field of Search ................. 174/65 G, 65 R, 174/64, 60, 65 SS, 153 G, 152 G, 135, 59; 248/56; 16/2.1, 2.2; 439/583, 584, 581, 462

(56) References Cited

U.S. PATENT DOCUMENTS

| | | | |
|---|---|---|---|
| 5,060,891 | * | 10/1991 | Nagy et al. ............................ 248/56 |
| 5,789,705 | * | 8/1998 | Cancellieri et al. .................... 174/59 |
| 6,116,945 | * | 9/2000 | Davis et al. ........................... 439/462 |
| 6,133,529 | * | 10/2000 | Gretz ................................... 174/65 R |

FOREIGN PATENT DOCUMENTS

| | | | |
|---|---|---|---|
| 3512577 | * | 10/1986 | (DE) .................................... 174/65 R |
| 2102637 | * | 2/1983 | (GB) ................................... 174/65 SS |
| 2276777 | * | 10/1994 | (GB) . |

\* cited by examiner

Primary Examiner—Dean A. Reichard
Assistant Examiner—Dhiru R Patel

(57) ABSTRACT

The invention is a snap-in electrical connector that includes a flange stiffened by an integral strut to provide a more secure gripping action on an inserted cable. The connector includes an elongated longitudinal slot, an integral bridge, and a short slot to facilitate easy insertion into an electrical panel or box. The flange contains serrated teeth and the channel wall includes a rear tooth opposite the flange to enable a secure strain relief grip on an inserted cable.

1 Claim, 3 Drawing Sheets

CABLE CONNECTOR

FIELD OF THE INVENTION

This invention relates to cable connectors and specifically to an improved cable connector that collapses easily to allow easy insertion in the knock-out of an electrical box, does not expand excessively in diameter upon cable insertion, and grips an inserted cable more securely than present art cable connectors of similar construction.

BACKGROUND OF THE INVENTION

Many varieties of cable connector are employed to connect electrical cables to junction boxes. The most traditional type of connector is barrel-shaped and constructed of metal. It consists of a front end that is threaded on its outer circumference and a rear end containing a hole formed laterally through the outer circumference of the connector. The hole in the rear end of the connector is threaded and fitted with a cable-securing screw that, in its unsecured position, extends slightly within the inner channel of the connector. The cable connector is typically secured at its front end to a junction box by inserting the externally threaded nose of the connector into a knockout hole in the junction box and then threading a nut tightly onto the nose portion. Electrical cable is then typically fed through the internal channel of the attached connector and the cable-securing screw is rotated until the cable is tightly secured against the far wall of the internal channel. Once tightened in this manner, the cable connector is secured to the junction box by the front threaded end and nut and the connector are secured to the cable by the cable-securing screw. Electrical connections later made within the junction box will therefore not be stressed or pulled loose by a rearward-pulling force on the electrical cable. This type of connection therefore provides strain relief to the interior electrical connections by relieving any stresses from rearward forces on the cable at the point where the cable-securing screw and bracket are affixed.

Other variations on this type of cable connector are those in which the rear or cable-securing end of the connector is a half-barrel or semi-circular shaped extension from the body of the barrel-shaped connector. Typically the semi-circular extension is tapped and threaded on both sides. A bracket containing holes on either end mates with the holes in the semi-circular extension. The bracket is held loosely to the semi-circular extension by screws and the screws may be advanced to tighten against a cable inserted within the channel of the connector and between the bracket and semi-circular extension of the connector. The screws may then be tightened thereby locking the cable with respect to the connector.

More recently, one-piece plastic cable connectors have been introduced. These connectors typically feature an integral clamping element that eliminates the need for a screw or screw and bracket combination to lock the cable in place. The connectors are designed to snap into an access hole in an electrical panel.

One such connector is described in U.S. Pat. No. 5,594,209 to Nattel et al issued Jan. 14, 1997. This patent describes a connector having a resiliently deflectable internal clamping element that has a single edge for gripping an inserted cable and at least one additional projection on the inner wall of the housing adjacent the clamping element to assist in clamping a cable. The connector also has a slot running along its entire length to facilitate its compression when inserting it into an electrical panel.

Another resilient one-piece connector is described in U.S. Pat. No. 4,970,350 to Harrington, issued Nov. 13, 1990, and describes a one-piece connector having an internal coupling means comprising a resiliently bendable flange for urging an inserted cable against the opposite inner wall of the channel. The flange may be provided with a pair of cable engaging tips to provide gripping engagement of the cable. A longitudinal slot extends along the entire length of the connector to facilitate its radial compression for insertion into an electrical panel.

Although the two aforementioned patents provide useful snap-in connectors for attaching cables to electrical panels, their design is not optimal as they rely upon a single surface to lock the cable in place. The reliance upon a single surface for gripping the cable also limited the aforementioned patents in the range of cable diameters that could be accommodated by the connector.

U.S. Pat. No. 6,177,633 to Gretz, issued Jan. 23, 2001 provided an improved cable connector that utilized a serrated engagement surface for retaining the inserted cable. The use of the serrated engagement surface provides a more secure gripping action on the inserted cable and has the additional benefit of being more readily adaptable to a larger variety of cable diameters without sacrificing cable retention capability.

The present invention improves upon the design of the flexible snap-in type cable connector described in U.S. Pat. No. 6,177,633, which is herein incorporated by reference. The connector of the present invention improves upon the design given in '633 by adding an integral bridge across the longitudinal slot. The bridge adds structural rigidity to the rear portion of the connector by preventing the rear channel of the connector from opening wider than a predetermined fixed amount determined by the length of the bridge. The bridge enables an installer to insert a cable within the connector, advance the cable the desired amount to provide sufficient cable to later make connections within the panel, and easily insert the connector into the panel. The bridge provides a pivot point that allows the nose portion of the connector to easily collapse allowing easy insertion into the panel or box.

A second improvement is achieved over the design given in '633 by providing a short slot on the front or nose end of the connector to further assist the front end of the connector in collapsing when pressed into the knockout of a panel or box.

An integral strut is provided between the flange and the interior wall of the channel in the present connector to further improve the design over the prior art in '633. The integral strut stiffens the flange and provides a more secure grip on an inserted cable.

ADVANTAGES

Several advantages of this invention over the prior art are:
(a) An integral bridge adds structural rigidity to the rear portion of the connector. When a cable is inserted within the connector, the bridge prevents the outward pressure exerted by the flange against the cable and channel wall from spreading the connector wider than desired.
(b) The bridge provides a pivot point that allows the nose portion of the connector to easily collapse allowing easy insertion into the panel or box.
(c) A short slot is provided on the front or nose end of the connector to further assist collapse of the front end of the connector when pressed into the knockout of a panel or box.

(d) An integral strut is provided between the flange and the interior wall of the channel to stiffen the flange and provide a more secure grip on an inserted cable.

These, and other advantages will become apparent in the attached drawings, the detailed description of the invention, and the appended claims.

DESCRIPTION OF THE INVENTION

The connector of the present invention is an improvement to the connector described in U.S. Pat. No. 6,177,633, issued to Gretz on Jan. 23, 2001. U.S. Pat. No. 6,177,633 is incorporated herein by reference.

Although the present invention shares many of the features of its predecessor, the design has been improved, including the rear portion of the connector has been modified to prevent it from spreading excessively, the front portion collapses more easily to allow easier insertion into a panel, and the gripping of the cable by the integral flange is increased.

Figure 1:
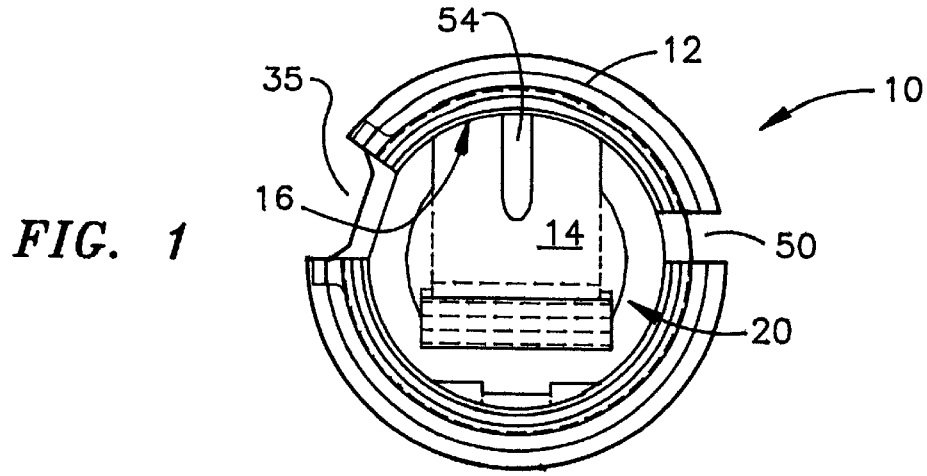
FIG. 1 is an end view of the improved snap-in connector of the present invention as viewed from the front.

FIG. 1, an end view of the improved snap-in connector of the present invention from the front end, shows the connector 10 from the front open end 20. An elongated longitudinal slot 35 and a short longitudinal slot 50 are located essentially on opposite sides of the cylindrical housing 12. An integral flange 14 extends from the inner wall 16 of the connector 10 and includes an integral strut 54 that increases the stiffness of the flange.

Figures 2, 3:
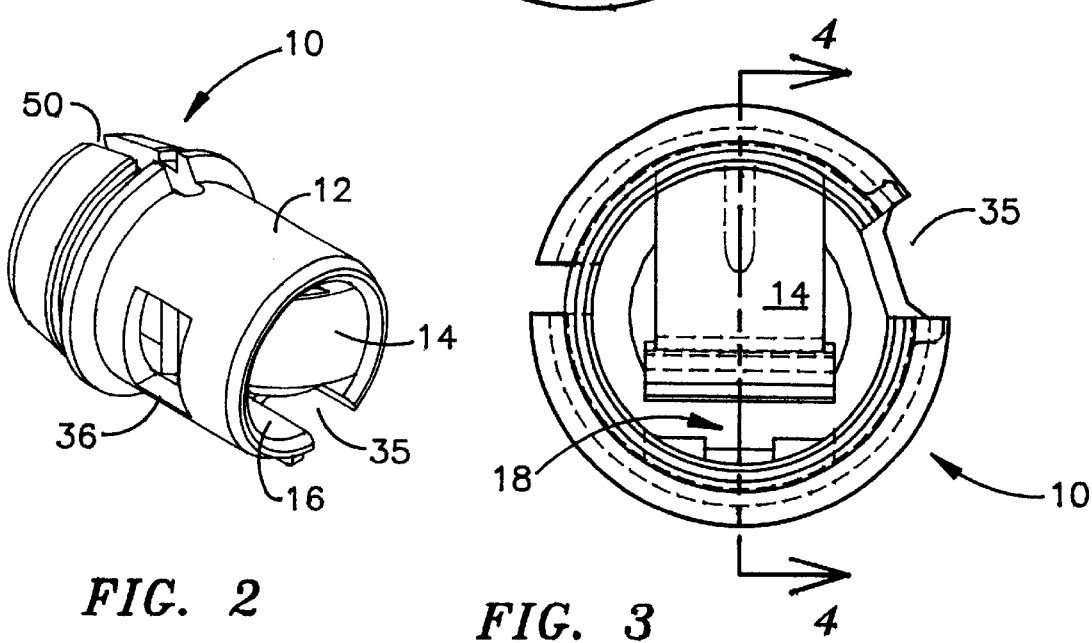
FIG. 2 is a perspective view of the present invention.
FIG. 3 is a rear end view of the present invention.

The perspective view of the connector 10 in FIG. 2 depicts the cylindrical housing 12 including an access aperture 36, the inner wall 16 of the cylindrical housing 12, the flange 14 extending from the inner wall 16, the elongated longitudinal slot 35 and the short slot 50. As shown in FIG. 2, the short slot does not extend the entire length of the cylindrical housing 12.

FIG. 3 is a view of the connector 10 of the present invention from the rear open end 18 and depicts the flange 14 and the elongated longitudinal slot 35.

Figure 4:
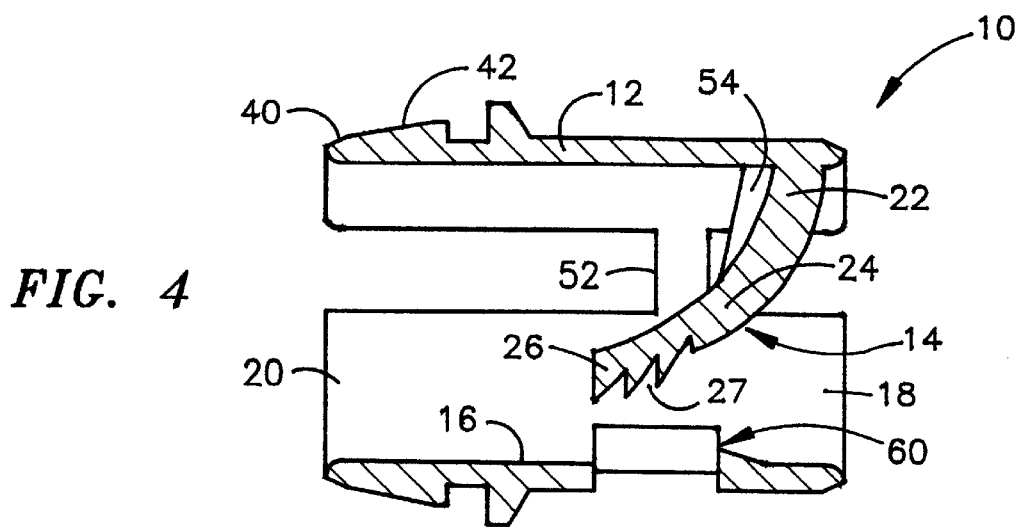
FIG. 4 is a side cross sectional view of the present invention including a cross section of the flange.

FIG. 4 depicts a cross-sectional view of the connector 10 of the present invention taken along lines 4—4 in FIG. 3. The connector 10 consists of an open cylindrical housing 12 having a front open end 20 and a rear open end 18. A cross-section of the integral flange 14 is shown extending from the inner wall 16 of the cylindrical housing 12 at a point near the rear open end 18. An integral strut 54 stiffens flange 14 and will provide the flange with a stronger gripping pressure on a cable later inserted within the connector 10. The flange 14 has a lower portion 22 at its juncture with the inner wall, a mid portion 24, and an upper portion 26 near its free end. Serrations 27, or teeth, are formed in the upper portion 26 of the flange 14. A rear tooth 60 extends from the inner wall 16 directly across from the serrations 27 on the upper portion 26 of the flange 14. The rear tooth 60 will assist the serrations 27 in gripping an inserted cable (not shown in FIG. 4). The front open end 20 of the connector 10 includes a tapered nose 40 and tapering 42 behind the nose to enable easy insertion into the knock out of a panel or box (not shown).

Figure 5:
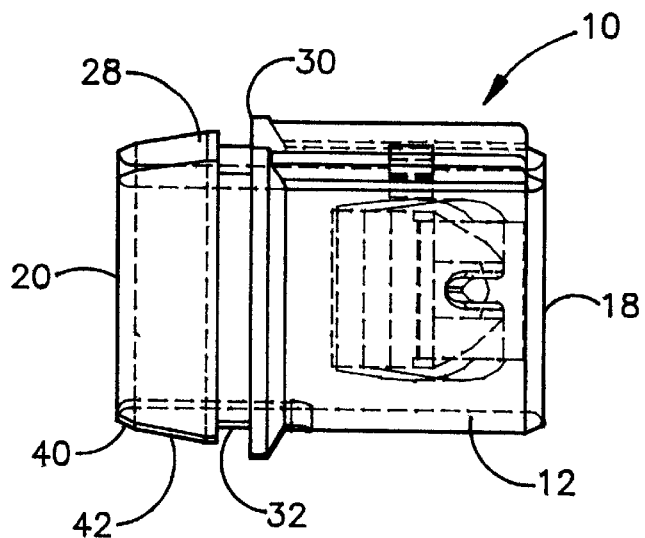
FIG. 5 is a bottom view of the present invention.

As shown in FIG. 5, a bottom view of the present invention, a circumferential channel 32 is formed in the cylindrical housing 12 at the end of the tapered nose 40 and tapering 42. The circumferential channel 32 is flanked by the forward circumferential flange 28 toward the front open end 20 of the connector 10 and by the rearward circumferential flange 30 toward the rear open end 18 of the connector 10.

Figure 6:
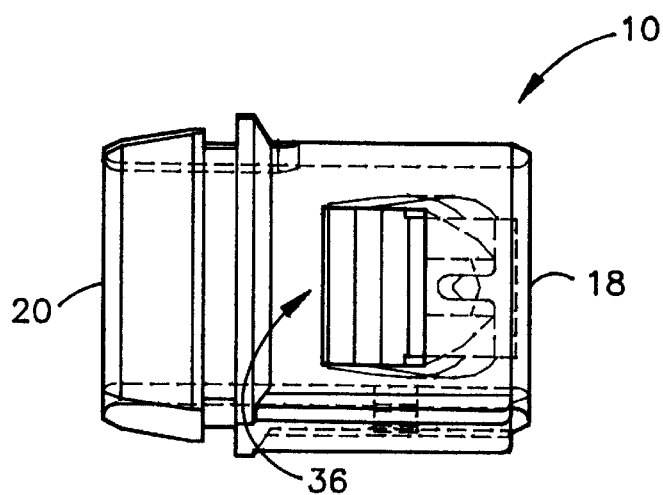
FIG. 6 is a top view of the present invention.

FIG. 6, a top view of the present invention, shows that the access aperture 36 provides access to the interior passageway through the connector 10 and to the serrations 27 on the upper portion of the flange 14. If it is desired to remove a cable that has been inserted into the connector 10, a tool such as a flat blade screwdriver may be inserted into the access aperture 36 to depress the cable and flange and allow the cable to be removed from the connector 10 by pushing it forward.

Figure 7:
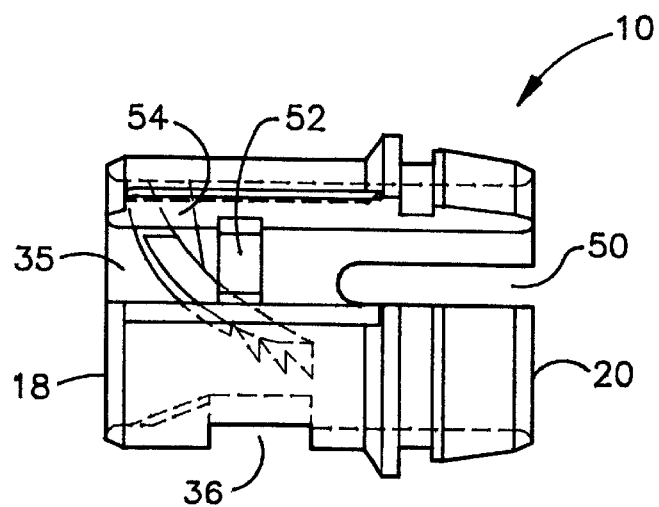
FIG. 7 is a side view of the present invention showing the elongated longitudinal slot, the bridge, and the short slot.

A side view of the present invention showing the elongated longitudinal slot 35, the bridge 52, and the short slot 50 is shown in FIG. 7. The elongated longitudinal slot 35 and the short slot 50 enable easy compression of the connector 10, allowing it to be easily inserted into a knock out in a panel. When a cable (not shown) is later inserted, the bridge 52 prevents the rear open end 18 from spreading excessively and thereby allows the integral flange 14 to maintain pressure on the cable.

Figure 8:
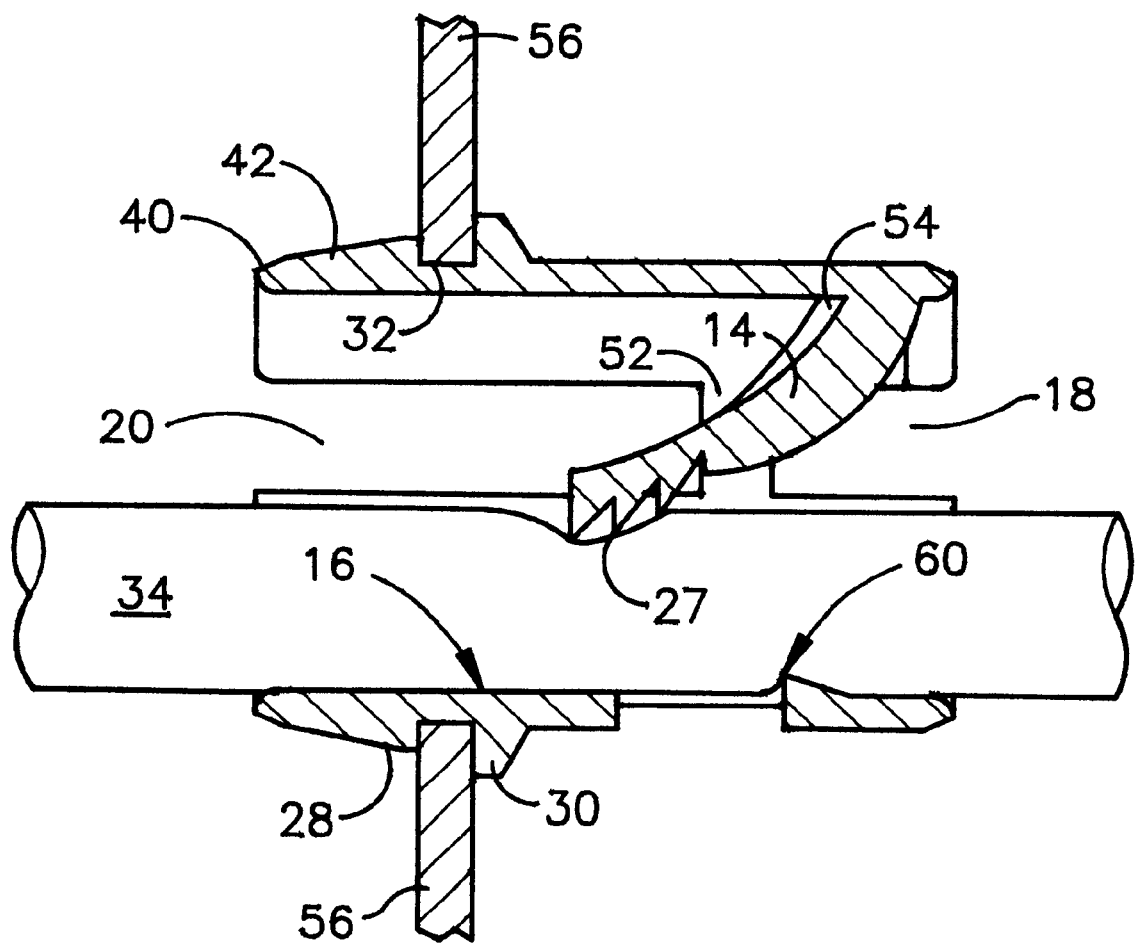
FIG. 8 is a cross-sectional view of the connector of the present invention showing an inserted cable and a panel to which the connector has been inserted.

FIG. 8 is a cross-sectional view of the connector 10 of the present invention showing an inserted cable 34 and a cross-section of a portion of a panel 56 into which the connector 10 has been inserted. In a typical installation job, an electrician would orient the connector 10 with the front open end 20 toward a knock out in a panel. The elongated longitudinal slot 35 and the short slot (not shown) enable easy compression of the connector 10 to reduce the effective diameter at the tapered nose 40. The tapered nose 40 may then be advanced into the knock out. The tapering 42 further along the nose portion of the connector 10 facilitates further advance of the connector into the knock out. As the panel wall portion 56 clears the tapering, the resilient connector 10 snaps outward to its relaxed state and the panel wall 56 becomes seated in the circumferential channel 32. The connector 10 is locked in place with respect to the panel 56 by the forward circumferential flange 28 and the rearward circumferential flange 30 and the outward pressure of the resilient connector 10 in its relaxed state. The installer can then insert a cable 34 into the connector 10. Advancement of the cable 34 depresses flange 14 and its integral strut 54 and the pressure exerted on the cable 34 by the flange 14 forces the cable 34 against the inner wall 16 of the connector 10. After the cable 34 is advanced as far as the installer desires, the cable 34 is locked into the connector between the serrated teeth 27 of the flange 14 and the inner wall 16 of the connector including the rear tooth 60. The connector of the present invention therefore provides strain relief. A rearward force applied on the cable 34 in an attempt to remove it from the connector 10 will only serve to pull the serrated teeth 27 more tightly into the cable 34. After installation, as shown in FIG. 8, the connector 10 is locked tightly onto the panel wall 56 and the cable 34 is locked securely into the connector 10.

One example of the present invention has been described in detail in this specification. It will become apparent to those skilled in the art that the present invention may be altered in many ways without departing from the spirit and scope of the invention. Thus the scope of the invention should be determined by the appended claims and their legal equivalents, rather than by the example given.

What is claimed is:

1. A cable connector for connecting flexible cable to a panel or electrical box comprising:

a cylindrical body including a front open end, a rear open end, and a longitudinal channel there through;

an elongated longitudinal slot extending the length of said cylindrical body;

an integral bridge formed across said elongated longitudinal slot, said bridge located near said rear open end of said body;

a flange integral with and extending from the interior wall of said channel in a curved manner substantially into said channel, said flange connected at its lower portion to the interior wall of the channel and free of said interior wall at its upper portion, said flange oriented such that said lower portion is substantially nearer said rear end than said upper portion;

a strut integral with and between said flange and said interior wall, said strut providing extra stiffness and support to said flange thereby biasing its orientation toward said channel;

a first circumferential flange on said first circumferential front end of said body, said flange tapered toward said front end to allow easy insertion into a knockout;

a second circumferential flange on said front end spaced farther along said body than said first circumferential flange, the space between said first and second circumferential flanges defining a circumferential channel; and a short slot extending from said front open end partially towards said rear end.

* * * * *